US012754970B2

(12) United States Patent
Kumar

(10) Patent No.: US 12,754,970 B2
(45) Date of Patent: Oct. 6, 2026

(54) FAST MATRIX MULTIPLICATION

(71) Applicant: Sudarshan Kumar, Fremont, CA (US)

(72) Inventor: Sudarshan Kumar, Fremont, CA (US)

( * ) Notice: Subject to any disclaimer, the term of this patent is extended or adjusted under 35 U.S.C. 154(b) by 1223 days.

(21) Appl. No.: 17/369,801

(22) Filed: Jul. 7, 2021

(65) Prior Publication Data

US 2022/0012304 A1 Jan. 13, 2022

Related U.S. Application Data

(60) Provisional application No. 63/048,966, filed on Jul. 7, 2020.

(51) Int. Cl.
*G06F 17/16* (2006.01)
*G06F 5/01* (2006.01)
*G06F 7/544* (2006.01)

(52) U.S. Cl.
CPC .............. *G06F 17/16* (2013.01); *G06F 5/015* (2013.01); *G06F 7/5443* (2013.01)

(58) Field of Classification Search
CPC ........................................................ G06F 17/16
See application file for complete search history.

(56) References Cited

U.S. PATENT DOCUMENTS 10,360,163 B2 * 7/2019 Woo ...................... G06F 9/3001
10,489,480 B2 * 11/2019 Akerib .................... G06F 17/16
11,170,289 B1 * 11/2021 Duong ................... G06N 20/00
12,197,532 B2 * 1/2025 Wang .................... G06F 18/214
12,287,843 B2 * 4/2025 Baum ................. G06F 9/30101
2003/0158879 A1 * 8/2003 Kwon ................... G06F 7/5443 708/620
2016/0283240 A1 * 9/2016 Mishra ................ G06F 9/30018
2018/0046898 A1 * 2/2018 Lo .......................... G06F 17/153
2018/0046900 A1 * 2/2018 Dally .................. G06F 9/30018
2019/0065150 A1 * 2/2019 Heddes ................. G06F 7/5443
2025/0068694 A1 * 2/2025 Pope ..................... G06F 7/4876

OTHER PUBLICATIONS

Patterson, David A., and John L. Hennessy. Computer Organization and Design: The Hardware/Software Interface (5th Edition). Morgan Kaufmann, 2013. (Year: 2013).*

Neil Weste and David Harris. 2010. CMOS VLSI Design: A Circuits and Systems Perspective (4th. ed.). Addison-Wesley Publishing Company, USA. (Year: 2010).*

* cited by examiner

*Primary Examiner* — James Trujillo
*Assistant Examiner* — Markus Anthony Villanueva
(74) *Attorney, Agent, or Firm* — Procopio, Cory, Hargreaves & Savitch LLP

(57) ABSTRACT

A system and method of multiplying a first matrix and a second matrix is provided, the method comprising compressing the second matrix into a third matrix to process primarily non-zero values. For each row in the first matrix, a row may be loaded into a row lookup unit. For each entry in the third matrix, a row address may be extracted, a row value may be obtained from a corresponding loaded row of the first matrix based on the extracted row address, the row value from the loaded row may be multiplied with the matrix value from the third matrix for each column, and the multiplied value may be added to an accumulator corresponding to the each column. Lastly, a multiplied matrix may be output for the loaded row.

11 Claims, 13 Drawing Sheets

Matrix Multiplication

| | | | | | |
|---|---|---|---|---|---|
| 1 | 2 | 4 | 1 | 1 | 1 |
| 1 | 3 | 4 | 0 | 1 | 5 |

Matrix A

| | | | | |
|---|---|---|---|---|
| 0 | 2 | 0 | 4 | 0 |
| 1 | 0 | 1 | 0 | 0 |
| 2 | 0 | 6 | 0 | 2 |
| 3 | 3 | 0 | 1 | 0 |
| 4 | 0 | 1 | 0 | 0 |
| 5 | 1 | 0 | 2 | 1 |

Matrix B

| | | | |
|---|---|---|---|
| 6 | 27 | 7 | 9 |
| 7 | 28 | 14 | 13 |

Product

FIG. 1

| | | | | | |
|---|---|---|---|---|---|
| 1 | 2 | 4 | 1 | 1 | 1 |
| 1 | 3 | 4 | 0 | 1 | 5 |

Matrix A (Row, Value) pair compressed matrix

| | | | |
|---|---|---|---|
| 0,2 | 1,1 | 0,4 | 2,2 |
| 3,3 | 2,6 | 3,1 | 5,1 |
| 5,1 | 4,1 | 5,2 | 5,0 |
| | | | |
| | | | |
| | | | |

Matrix B_CMP

| | | | |
|---|---|---|---|
| 6 | 27 | 7 | 9 |
| 7 | 28 | 14 | 13 |

Product

FIG. 2

Row Identifier for Matrix B

| | | | |
|---|---|---|---|
| 0 | 1 | 0 | 2 |
| 3 | 2 | 3 | 5 |
| 5 | 4 | 5 | 5 |
| | | | |
| | | | |
| | | | |

Value Identifier for Matrix B

| | | | |
|---|---|---|---|
| 2 | 1 | 4 | 2 |
| 3 | 6 | 1 | 1 |
| 1 | 1 | 2 | 0 |
| | | | |
| | | | |
| | | | |

FIG. 3

FAST MATRIX MULTIPLICATION

CROSS REFERENCE TO RELATED APPLICATIONS

This U.S. patent application is based on and claims the benefit of domestic priority under 35 U.S.C 119(e) from provisional U.S. patent application No. 63/048,996, filed on Jul. 7, 2020, the disclosure of which is hereby incorporated by reference herein in its entirety for all purposes.

BACKGROUND

Field

The present disclosure relates to matrix multiplication, and more specifically, methods for increasing the efficiency of matrix multiplication.

Related Art

In the related art, matrix multiplication is a basic operation in all computational applications of linear algebra. Often, large amounts of data need to be analyzed and processed. However, due to the basic mechanics and architecture of modern-day computers, matrix multiplication is highly limited in the amounts of data that can be processed.

Several programs have been created to account for this issue. For example, Basic Linear Algebra Subprograms (BLAS) may be used to perform common linear operations including matrix multiplication.

There are also methods of compressing matrices based on determining a number of nonzero entries, and then predicting a sparse representation of the multiplied matrices. However, these methods are limited because while hardware may be used to apply matrix multiplication, sparse matrix multiplication, and convolution operations separately, the same hardware cannot presently be used to perform all three functions, because of the immense amounts of data processing and storage required for the matrices.

SUMMARY

Matrix multiplication is one of the most computationally expensive operations for hardware systems. However, matrix multiplication is utilized often to facilitate functionality including numerical analysis, image processing, signal processing, and so on. There is a need to provide hardware and algorithmic techniques to speed up the operation of matrix multiplication as such operations become larger in scale. In particular, in machine learning implementations such as convolutional neural networks (CNN), deep neural network (DNN), and Recurrent Neural Network (RNN), the matrices being multiplied may require lots of compute resources such as Multiplier Accumulator (MAC), memory and memory bandwidth. Graphics chips with numerous MACs have been a popular way to implement such compute resources. However, such graphics chips are costly and power hungry.

Another implementation involves a hardware in chip or FPGA (Field Programmable Gate Array) dedicated for artificial Intelligence (AI) computing which can implement CNN, DNN and RNN in a power and cost-efficient way. However, the problem with such dedicated AI hardware is that they serve a limited purpose and are not suitable for general implementations. For example, some hardware implementations for vision processing cannot be used for DNN or RNN. Such implementations utilize separate hardware for CNN and DNN resulting in requiring more hardware.

Many AI hardware implementations cannot handle sparse matrix multiplication, which can reduce compute requirement by 10×-100×. Some hardware implementations involve special logic for handling sparse matrix, but they do not operate fast enough. In AI, models are trained once and matrix coefficients and other parameters obtained from training is used for inference multiple of times. For inference, the coefficient matrix is pruned and converted into integer to reduce the computing requirement. These operations make the coefficient matrix a sparse matrix involving many zero values.

Any hardware that can avoid multiplication by zero can speed up computation by 10×-100×. So for inference, sparse matrix multiplication can be very advantageous.

Example implementations described herein are directed to hardware implementations that are capable of handling CNN, DNN and RNN computation, but also handles sparse matrix through using the same computer hardware. Such implementations allow numerous instances of the same compute unit to carry out AI related computations, while retaining sufficient generality to carry out other computations in accordance with the desired implementation.

Aspects of the present disclosure include a method for multiplying a first matrix and a second matrix. This method may include loading a row of first matrix in a sequencer which sequences each elements of row which gets multiplied with each row of second matrix and results gets accumulated. The final accumulated result is a row (corresponding to row of first matrix) of product/multiplied matrix.

Additional aspects of the present disclosure include a method for multiplying a first matrix including a convolution with a second matrix. For each row in the first matrix, and more specifically, for each column in the first row, a second row of the second matrix may be loaded. Then, the value in each column of the first matrix may be multiplied with the values in the loaded second row. This multiplied value may be provided to an accumulator. Then, the loaded row of the second matrix may be shifted to correspond to the next column in the row of the first matrix. This multiplication and shift process may be repeated until the first column in the first row of the first matrix are completed. Then, the process may continue, starting with the next row in the first matrix and the next row of the second matrix, and so on, until the feature matrix is filled.

Additional aspects of the present disclosure include a system for multiplying a first matrix and a second matrix. This system may include a method to compress the second matrix into a third matrix, involving a row number/address and a value corresponding to the second matrix for non-zero values that is stored in the memory. The system may further include a row lookup unit that may load each row in the first matrix. For each entry in the third matrix, a new row address may be extracted by the row lookup unit. Then, the row address may be used to obtain a row value from a corresponding loaded row of first matrix by the row lookup unit. The system further includes a multiplier-accumulator configured to take the row value from the loaded row and multiply the row value with the matrix value from the third matrix for each column of the matrix. This value may then be added to the multiplier-accumulator corresponding to each column of the matrix. The output for this method may then be a multiplied matrix for the loaded row. The multiplier accumulator may involve a first shift register and a second shift register, a multiplier array, a carry service adder array, an output register and a carry propagate adder.

Additional aspects of the present disclosure include a non-transitory computer readable medium having stored therein a program for making a computer execute one or more of the methods described above.

BRIEF DESCRIPTION OF DRAWINGS

FIG. 1 illustrates a matrix multiplication according to an example implementation.

FIG. 2 illustrates a representation of a sparse matrix in a compact form according to an example implementation.

FIG. 3 illustrates an alternative representation of a sparse matrix in FIG. 2 in which the row and values for the compressed matrix is placed in two separate matrices.

DETAILED DESCRIPTION

Figure 4A:
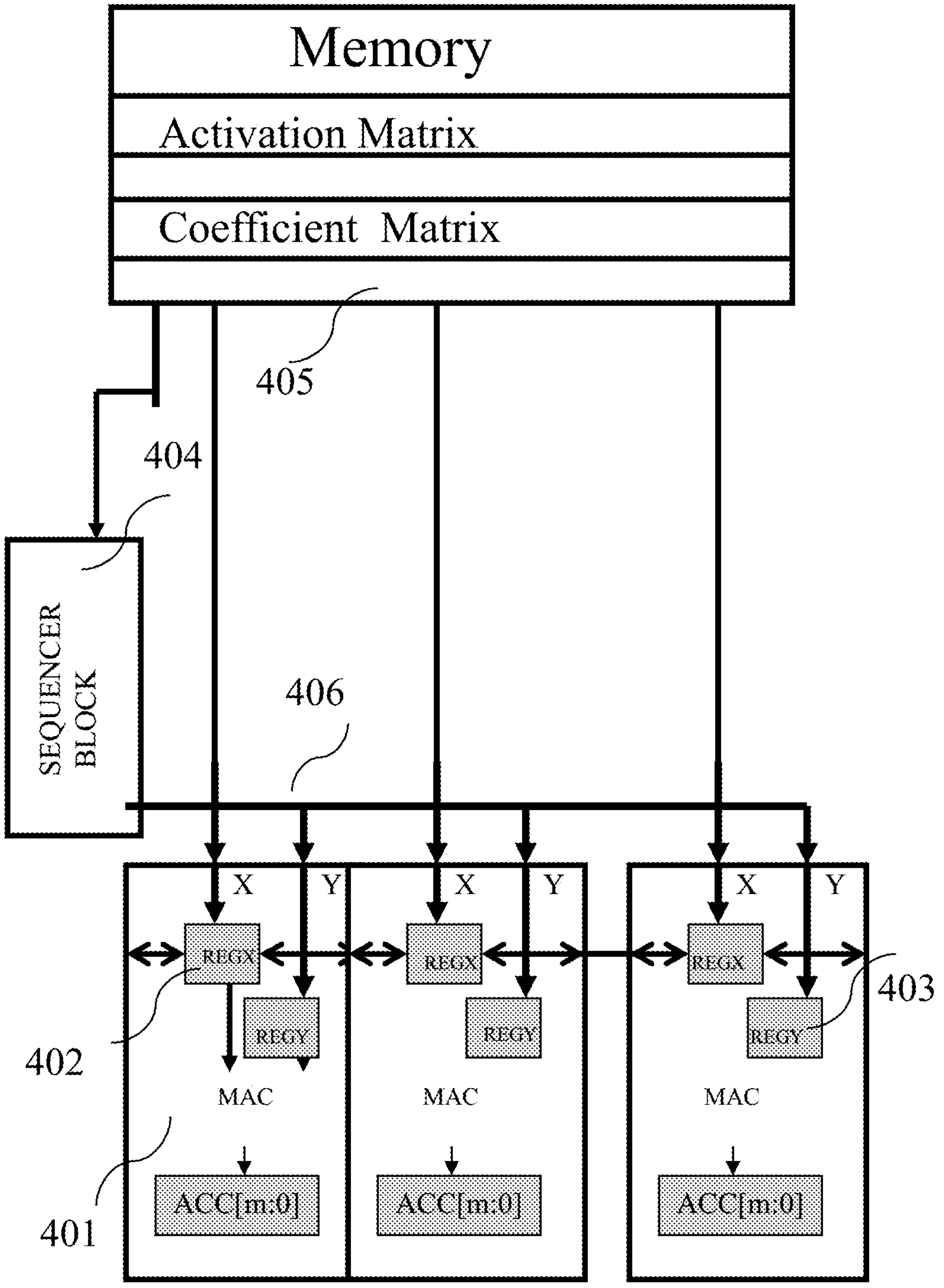
FIG. 4A is block diagram of Compute Engine Array (CEA) used for matrix multiplication and convolution, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

For each of the processes described below, one or more control units (not shown) may be connected to hardware blocks such as memory, row lookup unit (RLU), multiply accumulator, sequencers and other blocks. Then, a signal may be sent from control unit indicating the operations need to be performed by a block and also some signals needed by control unit may be sent to control unit. Control unit may configure and drive these hardware blocks such that these hardware blocks carry out different operations such as regular matrix multiplication, sparse matrix multiplication, convolutions and other computation supported by these hardware blocks.

FIG. 1 shows an example of matrices and the example matrix multiplication in accordance with an example implementation. Matrix A is the first matrix, matrix B is the second matrix, and the third matrix shown is the product of matrix A and matrix B. Matrix B is labeled showing rows 0-5 and columns 0-3 for purposes of explanation. In this example, the third matrix Product is A×B.

As shown in FIG. 2, matrix B may be compressed in order to eliminate zeros, thereby improving the efficiency of the calculation process. By eliminating multiply by zero, unnecessary computation can thereby be reduced. The top matrix A of FIG. 2 is the same as matrix A in FIG. 1, and the second matrix B CMP is a compressed matrix representation of matrix B of FIG. 1. The bottom matrix is the product of the multiplied matrix A and matrix B, with the same results as in FIG. 1.

Regarding the compression for matrix B in FIG. 1, for each non-zero value of matrix B, a row is assigned. For example, for matrix B shown in FIG. 1, column 0 (corresponding to the column beginning with value 2) has three non-zero values: 2, 3, and 1. These non-zero values are present at row 0 (corresponding to the row beginning with value 2), row 3 (corresponding to the row beginning with value 3), and row 5 (corresponding to the row beginning with 1). Thus, the row, value pair compressed matrix shown in FIG. 2 shows (0,2) (3,3) and (5,1) for the first column of matrix B_COMP of FIG. 2. Similarly, column 1, column2, column3 of Matrix B in FIG. 1 is compressed as column 1, column2, column3 of compressed matrix B_COMP of FIG. 2.

Additionally, zeroes may be filled in where rows/columns do not have a corresponding value using various schemes. For example, column 3 in matrix B of FIG. 1 only has two non-zero numbers. Thus, to balance out the matrix, a zero may be input as a value identifier at the bottom of column 3 for matrix B_CMP, shown in FIG. 2. It is important to notice that by eliminating zero values of matrix B of FIG. 1, the resulting compressed matrix B_CMP have only three rows instead of six. So for matrix multiplication, only half as much computation is required. Thus the matrix multiplication can be executed with half the compute resources (MACs), or can be completed faster with the same compute resources (e.g., half of time required for normal matrix multiplication)

FIG. 3 show an alternative storage of compressed matrix B_CMP in FIG. 2 in which row value is stored in a separate matrix (Row Identifier for Matrix B) and corresponding value is stored in separate matrix (Value Identifier for Matrix B).

FIG. 4A illustrates a Compute Engine Array (CEA), in which a matrix multiplication A×B and convolutions are performed in accordance with an example implementation. In the example of FIG. 4A, only the blocks and signals needed to demonstrate a normal matrix multiplication is shown and rest of details are omitted for the shake of clarity. As an example, register 402 can have inputs from various source through a multiplexer (mux). In this example, input X is shown to connect directly to Memory 405.

Figure 6:
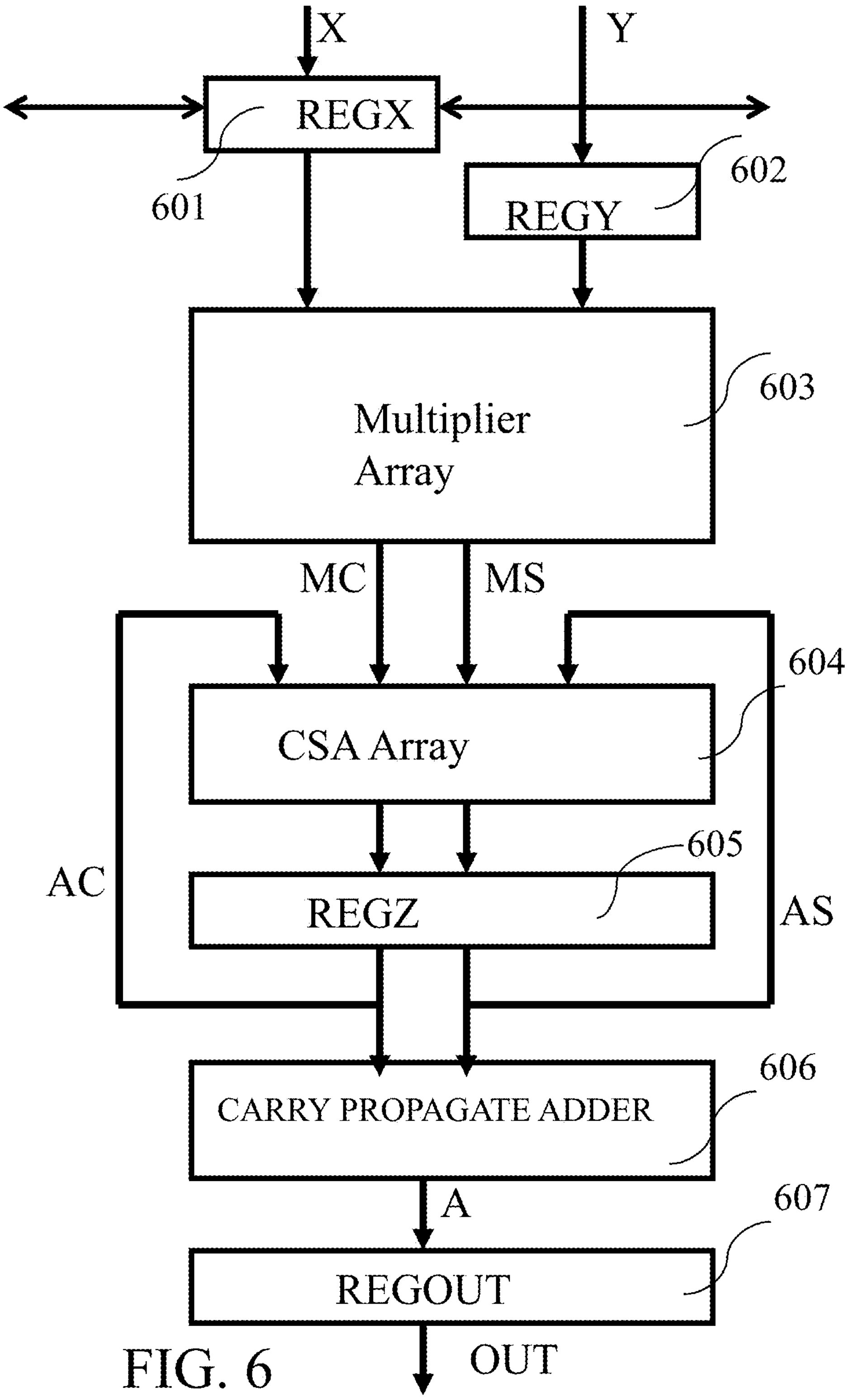
FIG. 6 illustrates an example hardware configuration of the multiplier accumulator (MAC), according to an example implementation.

Memory 405 is a memory system that is multi ported for both read and write such that it supplies X and Y operand for the MAC 401 and Sequencer Block 404. Memory 405 also supplies inputs to other CEAs. Memory 405 is configured to be written from various sources such as main DRAM memory, local memory or result output from MACs. Memory 405 is portioned in various segments each operating functionally different from each other. For example, memory segments holding coefficients may be configured to have a prefetcher to load coefficients in advance so that coefficients are available in Memory 405 during the course of multiplication. On the other hand, a segment of memory 405 holding an activation matrix can function as a first in first out (FIFO) queue for the input stream such as video. MAC 401 shown here is same as shown in FIG. 6, with some details removed for the sake of clarity.

Described herein is an example operation of normal matrix multiplication is better understood by using FIG. 1 as an example. Assume that the matrix to be multiplied A and B are in memory 405 as activation matrix and coefficient matrix respectively. As described herein, activation matrix A can be streamed in from outside such that memory 405 acts as a temporary buffer, or simply bypass this input and makes it available for computation.

First row of Matrix A [1,2,4,1,1,1] is loaded into sequencer block 404. Then each row of coefficient matrix is fetched from memory 405 as one operand of MAC and sequencer provided corresponding column of loaded row of matrix A. Result is accumulated in MAC accumulator. For example, to start with accumulators are cleared or loaded with fixed value such as bias. In first cycle of MAC operation, first column of First row of Matrix A whose value is "1" is put on common operand bus 406 and get multiplied with [2,0,4,0] individually in four MACs and results are individually accumulated for each column.

In a second MAC operation, the second column of first row of Matrix A whose value is "2" is put on common operand bus 406 and is multiplied with the second row of Matrix B [0,1,0,0] individually in four MACs and results are individually accumulated for each column. A maximum of six MAC operation cycles are performed and the first row of matrix Product in FIG. 1. is produced.

Similarly, the second row of matrix Product in FIG. 1 is generated. The final result is a Product Matrix=Matrix A*Matrix B.

Figure 4B:
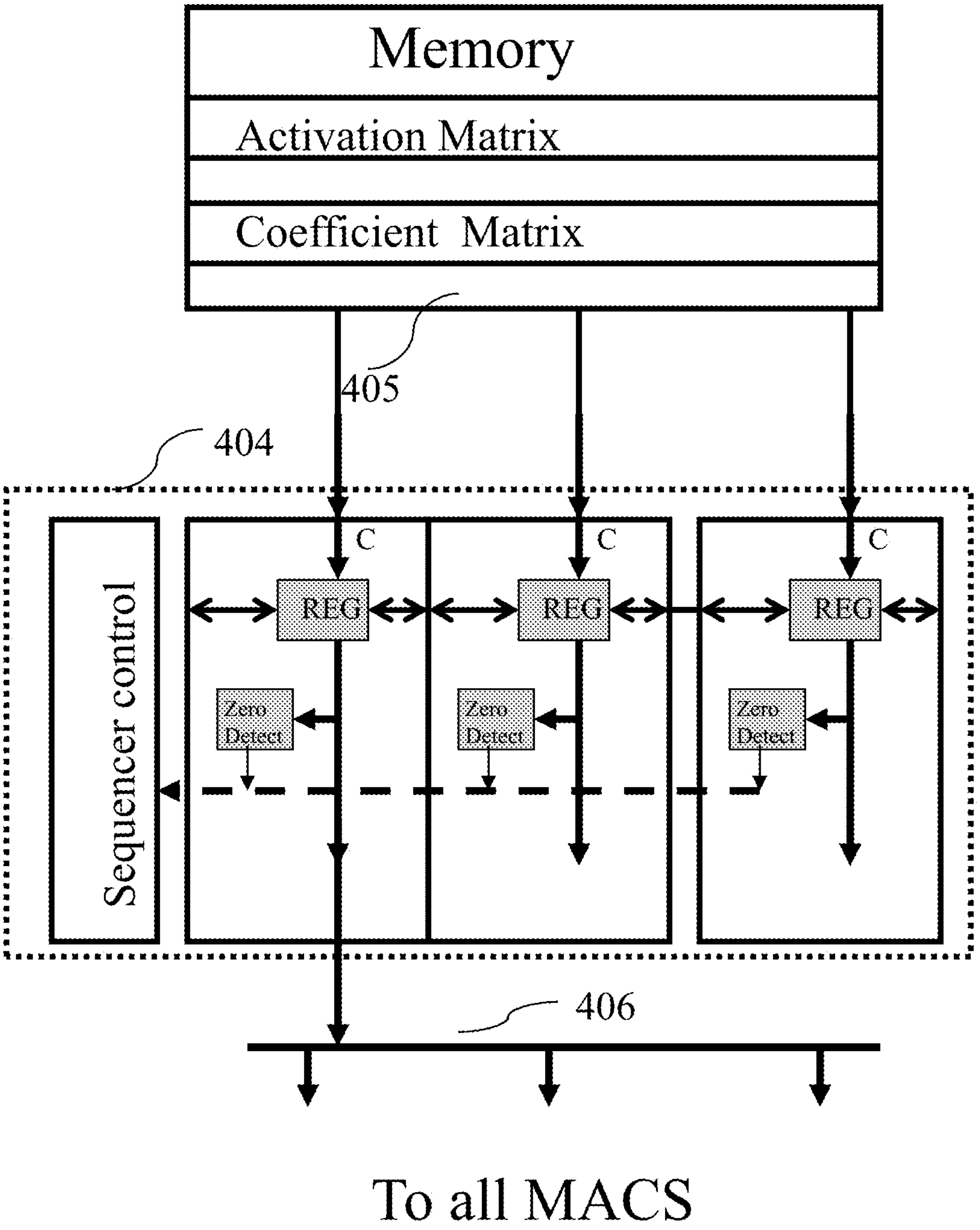
FIG. 4B is block diagram of SEQUENCER BLOCK, in accordance with an example implementation.

FIG. 4B illustrates an example block diagram of the sequencer block is shown as block 404 FIG. 4B which is same as block 404 FIG. 4B. Sequencer has a shift register just like MAC and can be made as a part of the MAC implementation. The shifted output is put on bus 406 FIG. 4B (same as 406 FIG. 4A) as common operand for all MACs. Sequencer has a zero detect circuit which helps it skip multiplication by zero operations, if it finds a zero in any element of Matrix A. For example, the second row and third column of Matrix A has zero. So multiplication by zero is skipped and the product matrix is generated in 11MAC cycles instead of 12 MAC cycles. In each MAC cycle, four MAC computes 4 MAC (Multiply accumulate) operation in this example.

Figure 5A:
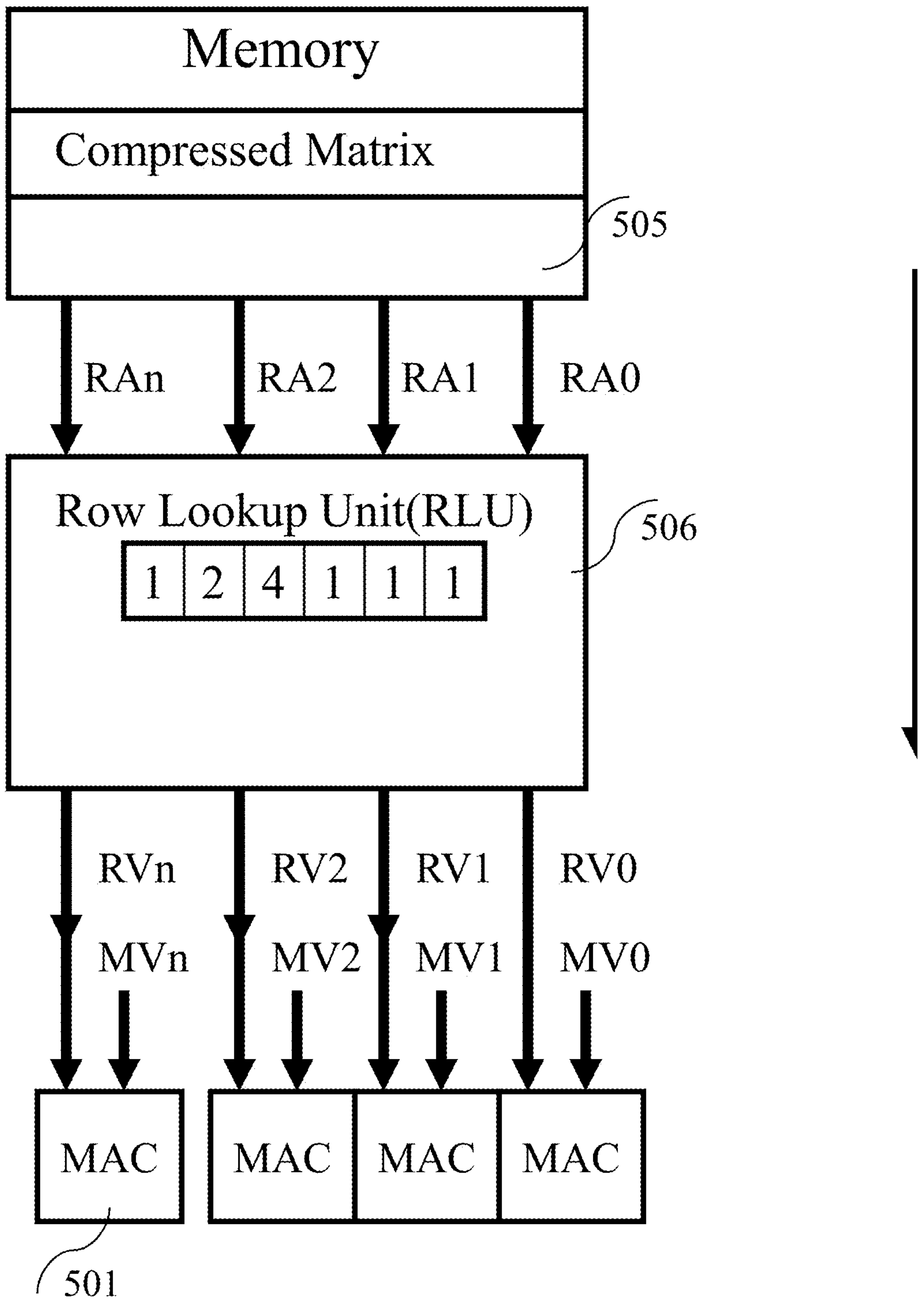
FIG. 5A illustrates a Row Lookup Unit (RLU) used in sparse matrix multiplication according to an example implementation.

FIG. 5A illustrates an example execution of a sparse multiplication. Here, all hardware details not related to sparse matrix multiplication are omitted for the sake of clarity. For example, sequencer block 404 in FIG. 4A and its bus connections are not shown here as it is not involved in the explanation of sparse matrix multiplication. Memory 505 is same as memory 405 of FIG. 4A. MAC 501 is same as MAC 401 which is also shown in detail in FIG. 6. Row Lookup Unit (RLU) unit 506 is shown getting input from Memory 505 and providing one of the MAC operand to each of MACs.

Figure 5B:
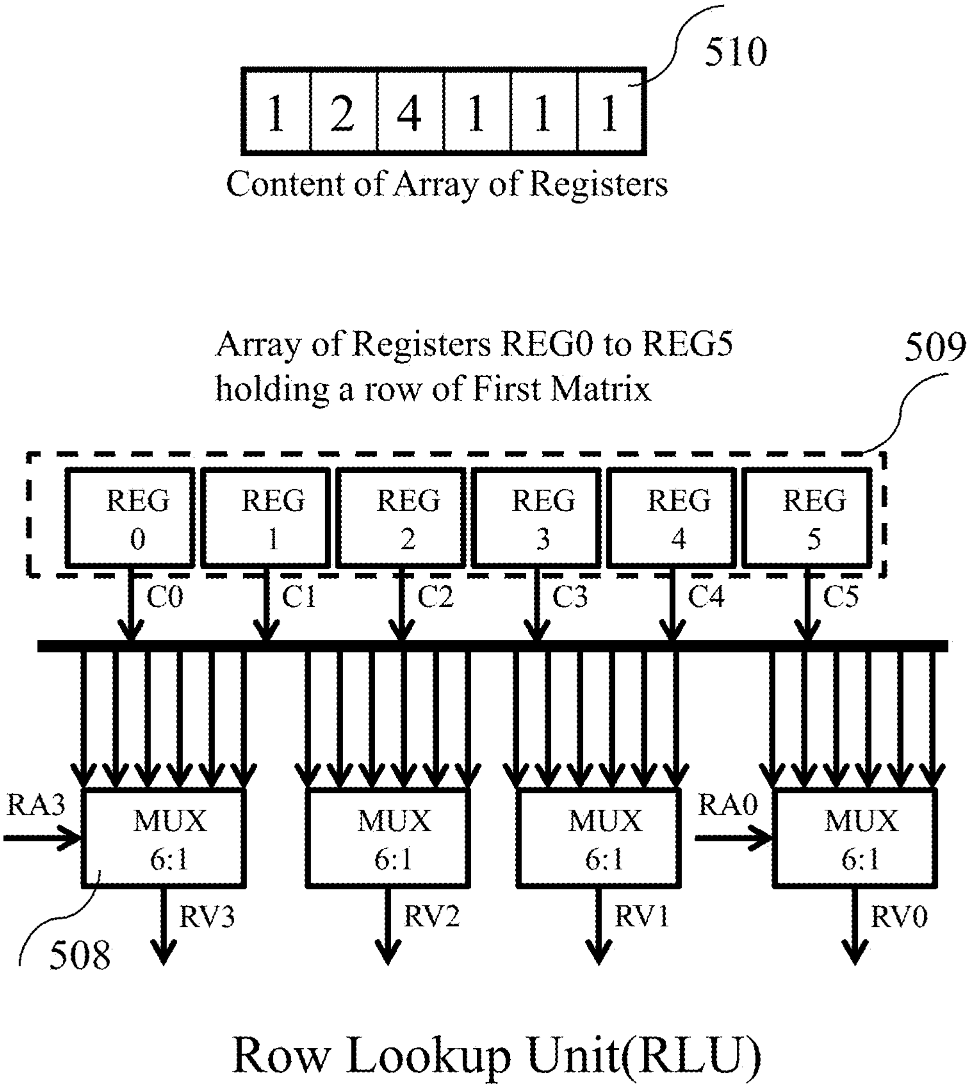
FIG. 5B is a block diagram of Row Lookup Unit (RLU), in accordance with an example implementation.

Matrix B_CMP as shown in FIG. 2 is loaded in memory 501. If memory is too small to hold all the values of matrix B_CMP, only a subset of the matrix is stored in memory. and a prefetcher prefetches the remaining matrix before its value is used for computation. To explain the operation, the example from FIG. 2 is taken and the value of "n" in FIG. 5 is 3. which means that there are four MACs to carry out this example computation. A block diagram of RLU is shown in FIG. 5B with 'n'=3 used in this example. In an actual use case, the value of "n" can be very large (e.g. hundreds, thousands). A row of activation matrix is loaded in six registers of Array of Registers 509 in FIG. 5A. Based on four row addresses obtained from memory 505 in FIG. 5, each row address RA0 to RA3 selects appropriate elements of row of matrix as Row Value (RV) using 6:1 mux 508 in FIG. 5B. For example, if RA3=0, MUX 508 in FIG. 5A selects C0 as row value RV3. If RA3=5, MUX 508 in FIG. 5A selects C5 as row value RV3. There are four such 6:1 MUX to output RV0, RV1, RV2, RV3 in response to row addresses RA0, RA1, RA2 and RA3 respectively. There four RA values RA0, RA1, RA2, RA3 is passed to four MACs as an operand for computation as shown in FIG. 5A).

Following illustrate details of sparse matrix computation performed following an example. In this example, the first row (or subset of) activation matrix A {1,2,4,1,1,1} is loaded in RLU. Then first row of matrix M_CMP is fetched from memory 505. Row address value {RA3,RA2,RA1,RA0}=[0,1,0,2] is passed on to RLU which selects the corresponding value from activation matrix loaded in RLU bases on row address and resulting in row value [RV3,RV2,RV1,RV0]=[1,2,1,4]. For example, RA0=2 selects the third column value of 4 from activation matrix [{1,2,4,1,1,1}. RV values of RV3,RV2,RV1,RV0]=[1,2,1,4] and MV values [MV3,MV2,MV1,MV0]=[2,1,4,2] which are fetched directly from memory 505 are fed to MACs as X & Y inputs for matrix multiplication and partial results are accumulated in accumulator. Then, the second and third row of MATRIX_CMP is processed in similar manner. The resulting accumulated value of [6,27,7,9] is the first row of Product matrix. Similarly, the next three MAC cycles are used to multiply the second row of Matrix A with MATRIX_CMP, resulting in the second row of product matrix. In a sparse matrix multiplication, a total of six MAC cycles are used while in normal matrix multiplication eleven MAC cycles are used. That means in this example, the sparse matrix multiplication has a reduced latency of six cycles, (versus eleven cycles in regular matrix multiplication) and double the throughput. In a practical case, by using sparse multiplication as described herein, the latency and throughput can be improved by tenfold or greater, while consuming less power.

FIG. 6 illustrates an example of the hardware configuration for the MAC. REGX 601 and REGY 602 may be inputs for the MAC. As described below with respect to a convolution in FIG. 7, at least one of the registers may shift left or right by a multiple of operand width. MAC is configured to handle several operand widths. For example, a MAC with a 16 bit operand width is capable of carrying out two MAC operation of 8 bit width.

The multiplier array 603 may multiply REGX and REGY inputs to output a sum MS and a carry MC using CSA Array inside a multiplier to add all partial products of the multiplier. The CSA Array may be implemented in hardware using carry save adder such as 3:2 carry save adder (CSA)/compressor, a half adder, a 4:2 compressor, and so on, in accordance with the desired implementation.

Multiplier output MS, and MC gets added to accumulator REGZ outputs AS and AC using another small CSA Array 604 and result gets stored in accumulator REGZ. So far, all the operations are in sum and carry form. It is also call redundant form. When all MAC operations are completed over several cycles and result is accumulated in REGZ, final outputs are obtained by adding redundant outputs AS and AC by carry propagate adder (CPA) 606. Not shown in FIG. 6 are other support logics that can utilized such as rounding, shift and logic units to process outputs before sent out. Some of these support logic units may get inputs from other sources other than adder output. Final outputs are either registered in register 607 called REGOUT, or can get sent directly to another MAC, memory or some other compute unit. For clarity, the muxes used for muxing inputs or outputs or internal values are omitted.

In another example implementation, there could be multiple copy REGZ 606 or REGOUT 607 to hold temporary results. They may be implemented as register file or memory if needed. The purpose is to reuse the operands as much possible so that they need not be fetched for another operation. These registers also can be written from outside to hold operands.

In example implementations, REGZ 605 may not be used al all and hence may not be in MAC. In that case, CSA Array 604 outputs are fed into CPA 606 and output in accumulated in REGOUT 607. Output of REGOUT 607 is feedback into CSA Array 604 for accumulation addition.

It is noted that although the example of FIG. 6 illustrates an example hardware configuration for implementing a multiplier accumulator, any other type of MAC can be utilized to facilitate the same functions in accordance with the desired implementation.

Figure 7:
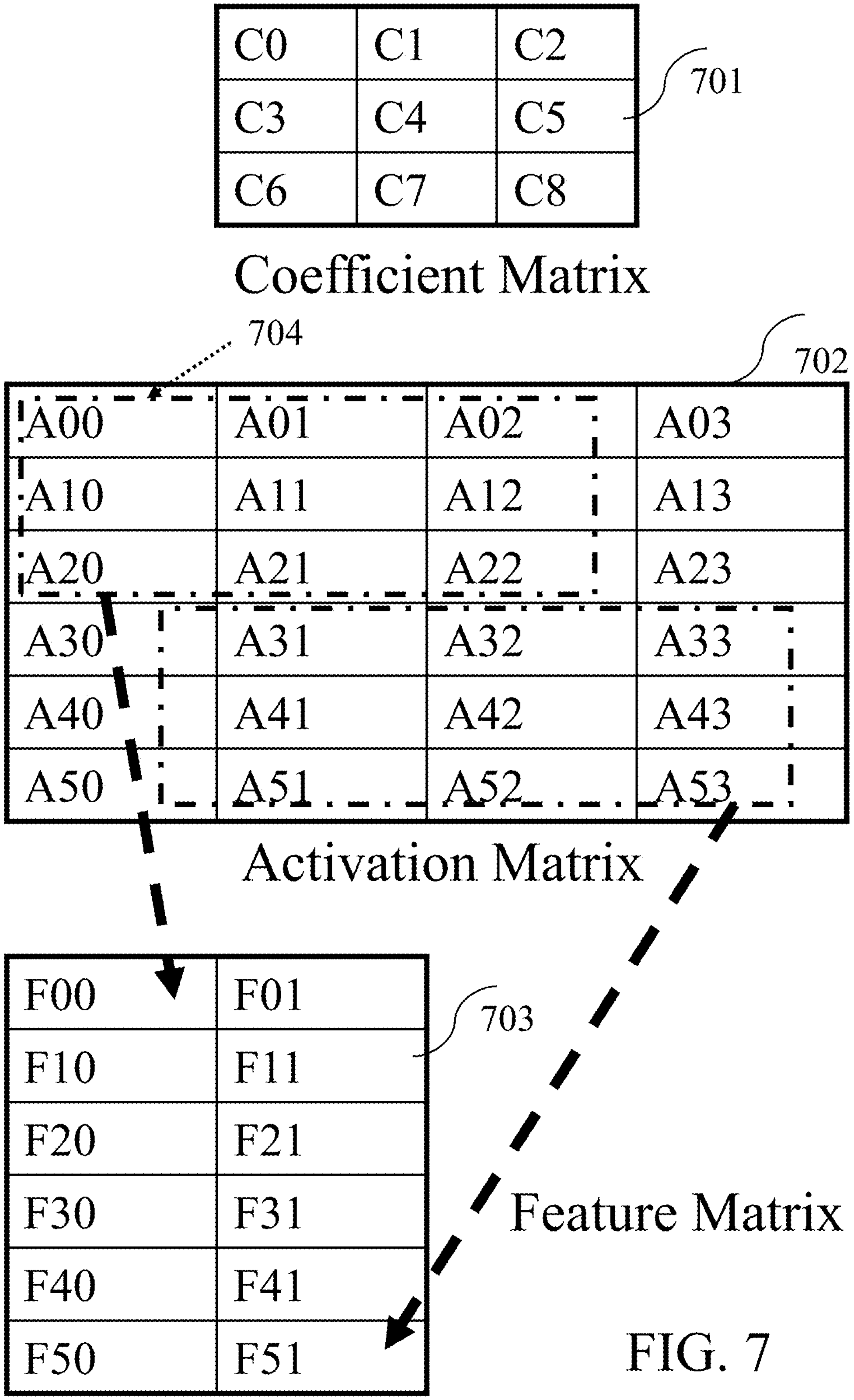
FIG. 7 illustrates a process for a matrix convolution.

FIG. 7 illustrates an example process for multiplying matrices for a convolution. Convolution operation used in CNN (Convolutional Neural Network) is understood by ones of ordinary skill in the art. The Coefficient Matrix 701 is 3×3 in this example, but can be larger matrix such as 4×4 or a 5×5 matrix. For each corresponding block in the activation matrix 702, the Coefficient Matrix 701 is moved over activation matrix such as a window from left to right and from top to bottom and each element of feature matrix 703 is computed. For example, the value of first row and first column of Feature matrix is generated by multiplying each element of coefficient matrix 701 with corresponding elements of activation matrix 702, enclosed by convolution box 704 and results added together. In this case, F00=C0*A00+C1*A01+C2*A02+C3*A10+C4*A11+C5*A12+C6*A20+C7*A21+C8*A22. Then convolution box 704 is stepped right or below by one column or one row, and corresponding Feature Matrix value is calculated. Similarly, F51 is calculated as F51=C0*A31+C1*A32+C2*A33+C3*A41+C4*A42+C5*A43+C6*A51+C7*A52+C8*A53. as convolution box is moved to lower right corner.

Figure 8:
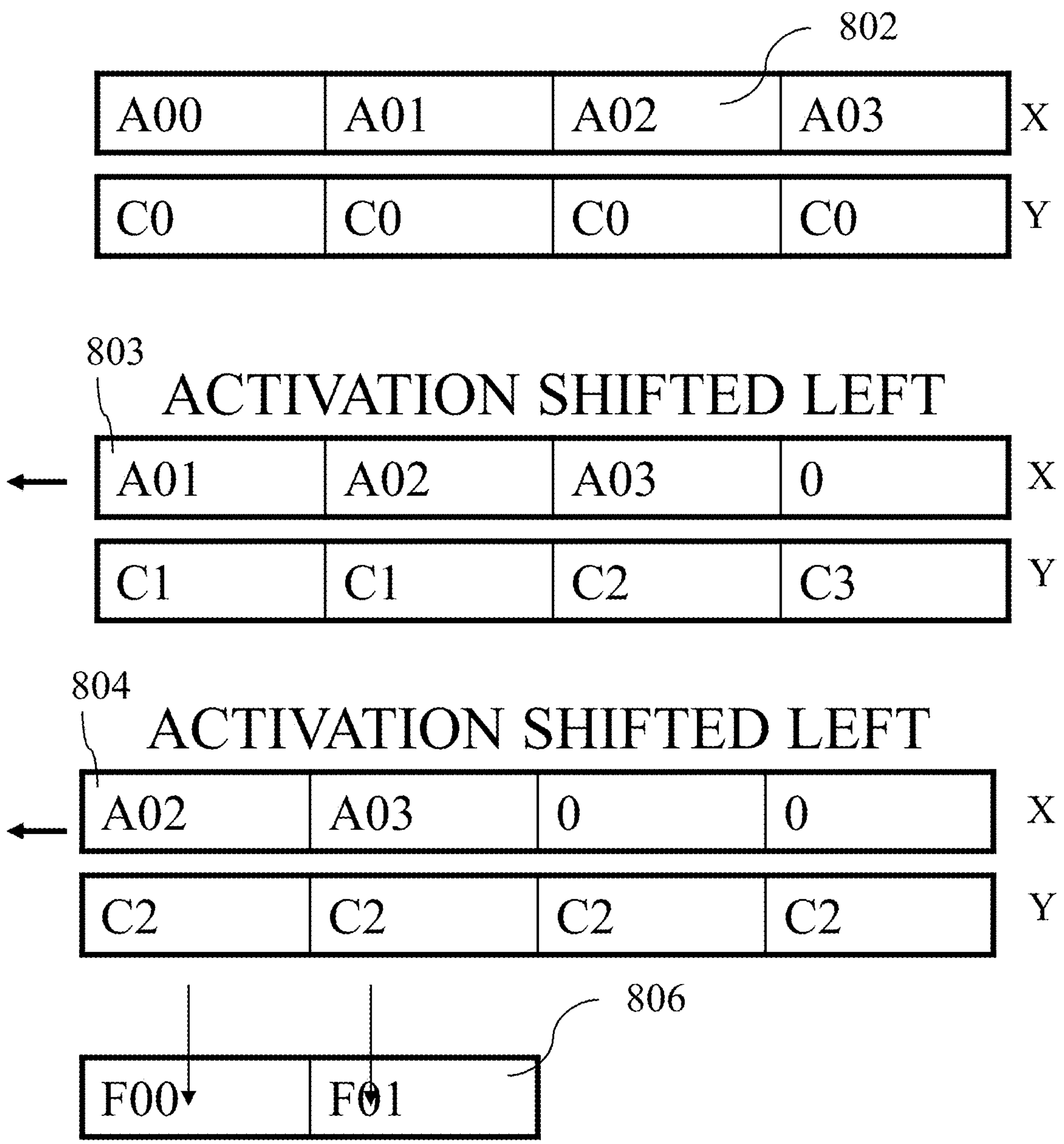
FIG. 8 illustrates the matrix convolution shown in FIG. 7 implemented in hardware, in accordance with an example implementation.

The above convolution operation is implemented in example implementations as shifting operation as shown in FIG. 8. Shifting operation is achieved by sequencer block 404 in FIG. 4A as well as shift register REGX 402 and REGY 403 in FIG. 4A. As in a present example of convolution, the first row of activation matrix 702 in FIG. 7 (A00, A01, A02 A03) is loaded from memory or other source into REGX of the four MACs in this example.

In an actual implementation, the number of MACs can be very large. The first row Coefficient Matrix 701 in FIG. 7 (C0, C1, C2) is loaded in Sequencer block 404 in FIG. 4A which shifts out first coefficient C0 in to REGY of each of four MAC. All four MACs do multiply and accumulate. In a next cycle, as shown in 803 of FIG. 8, REGX in all four MAC is shifted left by a operand width (in this example by a MAC) and Sequencer block 404 in FIG. 4A shifts out second coefficient C1 in to REGY of each of the four MACs. All four MACs conduct multiply and accumulate operations.

In the third cycle, as shown in 804 of FIG. 8, REGX in all four MAC is shifted left by an operand width (in this example by a MAC) and Sequencer block 404 in FIG. 4 shifts out a third coefficient C2 in to REGY of each of the four MACs. All four MACs execute multiply and accumulate operations. Thus, in three cycle partial convolution result of F00=C0*A00+C1*A01+C2*A02 is generated. Then, the second row of activation matrix 702 (A10, A11, A12, A13) is convoluted with coefficient (C3, C4, C5) in the similar manner in three cycle. Next third row of activation matrix 702 (A20, A21, A22, A23) is convoluted with coefficient (C6, C7, C8) in the similar manner in three cycles. After nine cycles, the convoluted result F00=C0*A00+C1*A01+C2*A02+C3*A10+C4*A11+C5*A12+C6*A20+C7*A21+C8*A22 is calculated. In parallel F01 is also calculated as F01=C0*A01+C1*A02+C2*A03+C3*A11+C4*A12+C5*A13+C6*A21+C7*A22+C8*A23. So in nine cycles, convolution result which is first row feature matrix 806 is calculated at the same time. Although not shown in the diagram, if needed, F02 and F03 is also calculated at the same time in the similar manner as F00 and F01. When the row of activation matrix is shifted left during convolution, zero may be appended to right hand side. This can also be viewed as activation matrix 702 being padded with two columns containing zero values. This padding is required only if F02 and F03 are desired to be in feature matrix.

In the above described convolution operation example, the coefficient matrix have been fetched one row at a time, involving three memory fetch. They (C0, C1, C2, C3, C4, C5, C6, C7, C8) can be fetched all at once saving memory accesses. Further memory access can be saved if a row of activation matrix is fetched only once. All the required convolution computations for the fetched row of activation matrix are done, and the temporary results containing partial value of different rows of Feature matrix are saved in separate copies of accumulator REGZ 605 of FIG. 6. This saves power related to fetching rows of activation matrix by avoiding multiple fetches of the same row of activation matrix.

Figure 9:
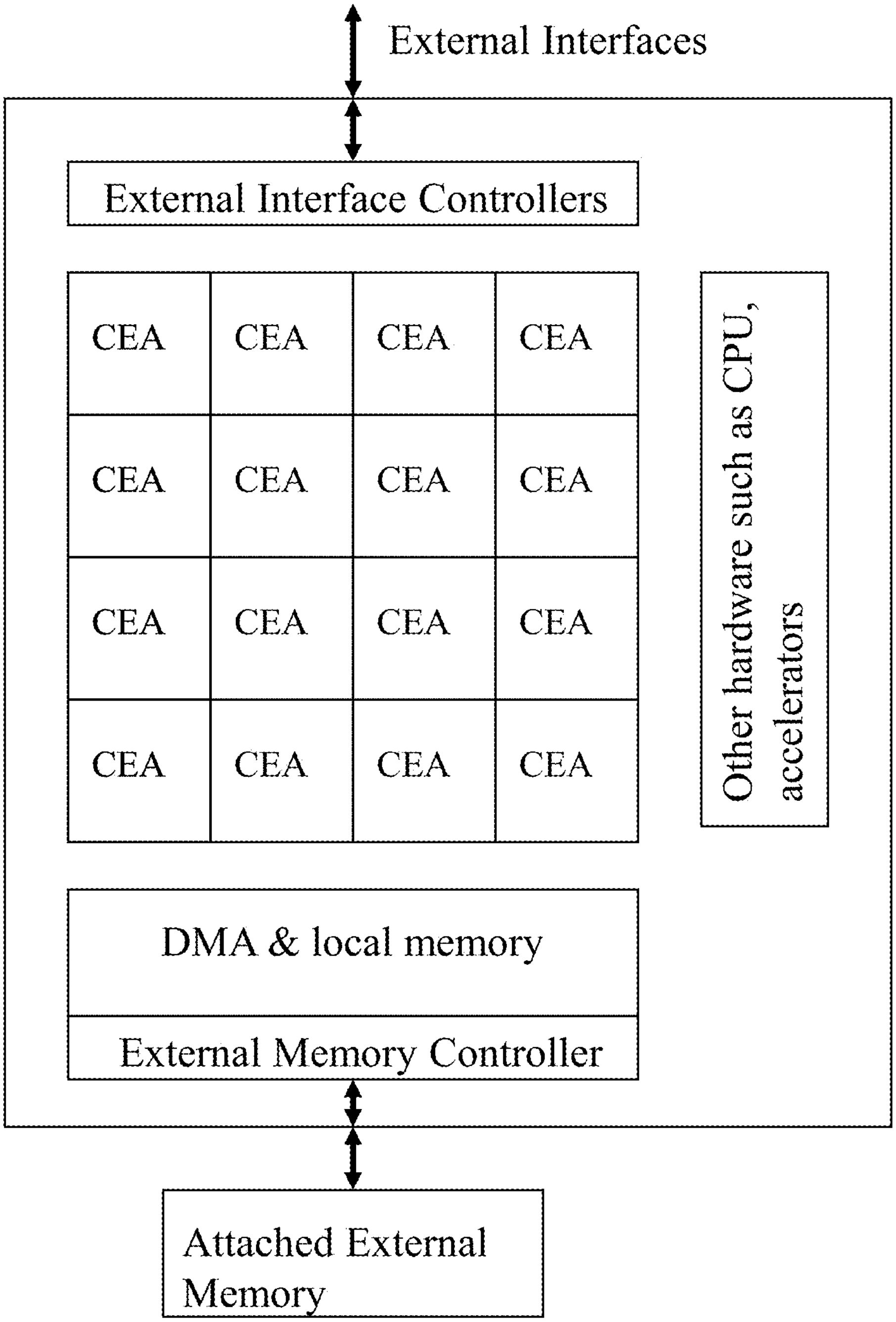
FIG. 9 illustrates an example of use of CEA in a computer system.

FIG. 9 illustrates how CEA (Compute Engine Array) in FIG. 4A can be used. CEA can be arrayed in one or two dimensions. They are connected to local memory. Local memory can be loaded with data from either attached external memory such as DRAM or Flash or other memories connected through external interfaces. Memory transfer typically happens through the use of DMA (Direct Memory Access). External interfaces may include but not limited to PCIE, USB, I2C, MIPI, GPIO, SPI, and so on.

FIG. 9 also includes other blocks which may have CPU and other hardware such as compression & decompression engine, encryption & decryption engine, integer or floating point DSP and other compute engines. Using local CPU, hardware in FIG. 9 can act as a standalone system capable of carrying out needed computation or it can be a slave accelerator card connecting to a larger system through PCIE, USB or any other IOs. Hardware in FIG. 9 can be implemented in FPGA or ASIC using single or multiple FPGA or ASIC.

Figure 10:
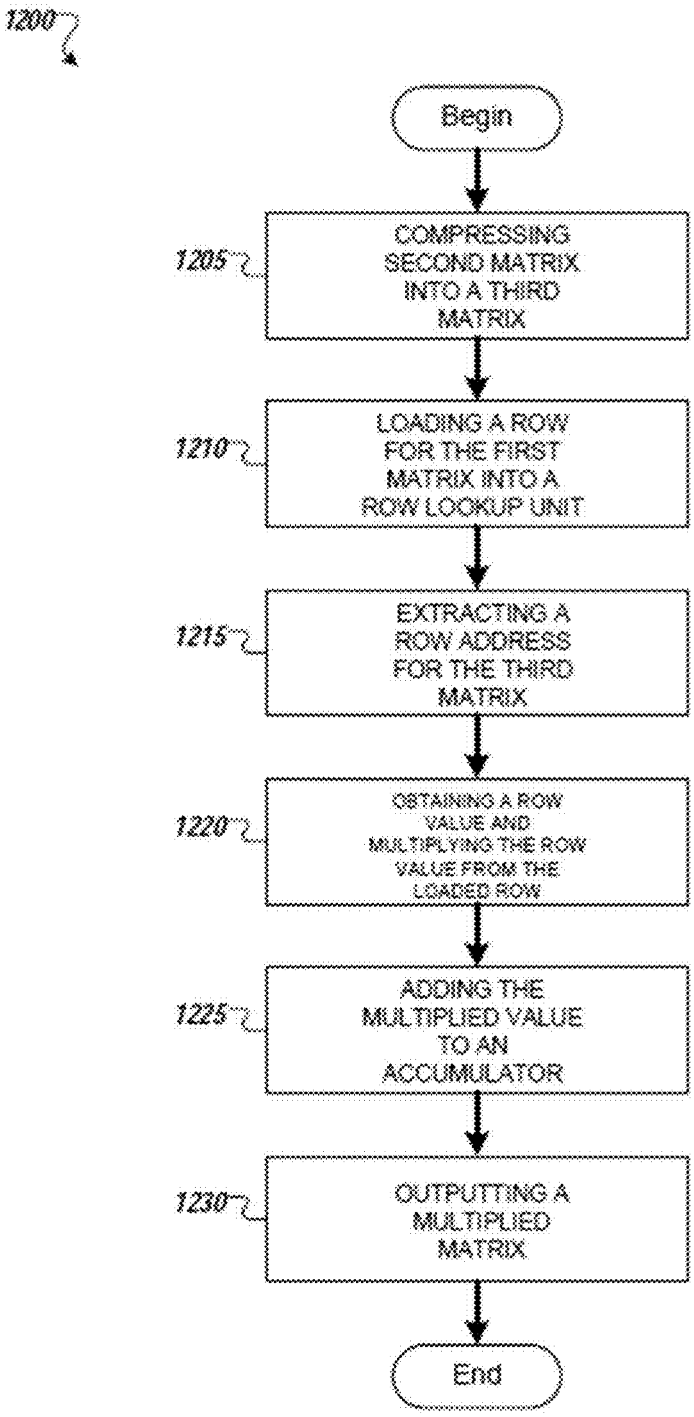
FIG. 10 illustrates a flowchart for multiplying a matrix, according to an example implementation.

FIG. 10 illustrates an example process for sparse matrix multiplication of a first matrix with a second matrix, according to an example implementation. The process 1200 may begin by compressing the second matrix into a third matrix at 1205. Then, a row for the first matrix may be loaded into a row lookup unit (RLU) at 1210. Next, a row address from the third address may be extracted at 1215.

A row value may then be obtained from RLU using row addresses obtained in 1215, which then may be multiplied with the matrix value obtained from third matrix at 1220. Then, the multiplied value may be added to an accumulator (for example, MAC described above) at 1225. Finally, a multiplied matrix may be outputted as product matrix after all the rows of third matrix is processed at 1230. In case first matrix has multiple rows, then for each row of first matrix, process 1210,1215,1220,1225 and 1230 is performed in order to get corresponding rows of product matrix.

Figure 11:
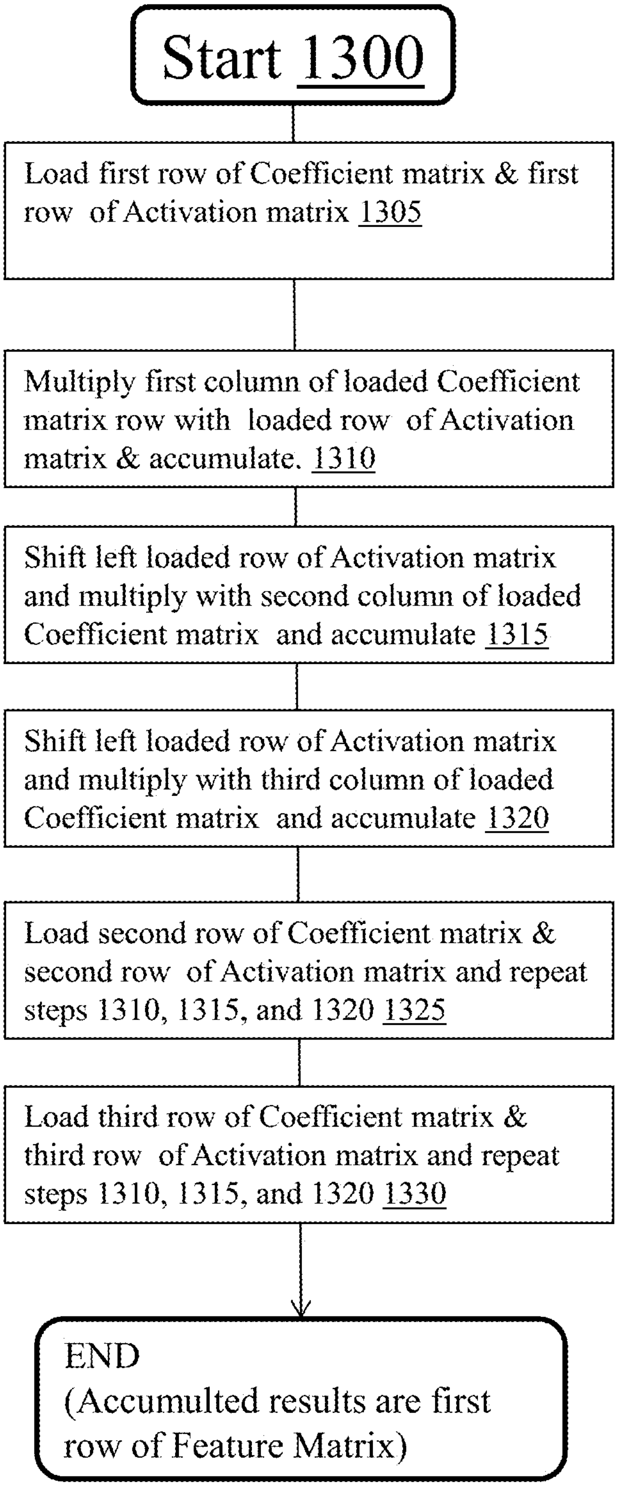
FIG. 11 illustrates a flowchart for multiplying a matrix for a convolution, according to an example implementation.

FIG. 11 illustrates an example process for convoluting a first matrix with a second matrix, according to an example implementation. The flow diagram illustrates an example for how a first row of resulting Feature matrix 703 in FIG. 7 can be computed by convoluting Coefficient matrix 701 in FIG. 7 with a first (top) row, second row and third row of activation matrix 702 in FIG. 7. The process 1300 may begin as follows. In 1305, the first row of Activation matrix 702 in FIG. 7 (A00, A01, A02, A03) is loaded from memory or other sources into REGX of the four MACs in this example. First row Coefficient Matrix 701 in FIG. 7 (C0, C1, C2) is loaded in Sequencer block 404 in FIG. 4A which shifts out the first coefficient C0 in to REGY of each of the four MACs.

In process 1310, 1315, and 1320, MAC (multiply & accumulate) operations with shifting operations are performed in three clock cycles. These operations are also illustrated in 802, 803, and 804 of FIG. 8. After the above process in completed, in process 1325, the second row of Activation matrix 702 in FIG. 7 (A10, A11, A12, A13) is loaded from memory or other source into REGX of the four MACs in this example, and second row Coefficient matrix 701 in FIG. 7 (C3, C4, C5) is loaded in Sequencer block. Processes 1310,1315 and 1320 are repeated in three clock cycles. After the above processes are completed, in process 1330, the third row of Activation matrix 702 in FIG. 7(A20, A21, A22, A23) is loaded from the memory or other source into REGX of the four MACs in this example, and third row Coefficient Matrix 701 in FIG. 7 (C6, C7, C8) is loaded in Sequencer block. Processes 1310,1315 and 1320 is repeated in three clock cycle. The resulting accumulated values in MACs is the first row of Feature matrix 703 in FIG. 7. The same process can be used to compute rest of rows of Feature matrix 703 in FIG. 7.

In example implementations such as that illustrated in FIGS. 4A and 4B, there can be a system configured to conduct a computation, the system involving a memory system configured to provide operands for the computation and store results, and a sequencer configured to load a set of the operands from the memory system; shift the loaded set of operands to form shifted operands; and provide each operand of the shifted operands to a multiplier accumulator (MAC) from an array of MACs as an operand while skipping ones of the shifted operands that are zero. Each MAC of the array of MACs can involve a plurality of registers configured to receive an input of provided operands and shift the provided operands between adjacent MACs in the MAC array or within the each MAC; a multiplier configured to multiply the provided operands; an accumulator configured to store a temporary result; and an adder block configured to conduct one or more of an add, shift logic, and rounding operation to calculate a final output.

As illustrated in FIGS. 4A and 4B, the memory system can be configured to fetch or prefetch the operands and provide the fetched or prefetched operands for the computation. Depending on the desired implementation, the memory system is also configured to receive and buffer streaming input and provide the streaming input as the operands for the computation.

Depending on the desired implementation, the computation can involve matrix multiplication between a first matrix and a second matrix. In such an example implementation, the sequencer is loaded with a row of the first matrix and is configured to, for each element of the loaded row from the first matrix, perform a shift left operation to produce an operand common to all MACs of said MAC Array, the all MACs of the MAC Array are loaded with a corresponding row of a second matrix; wherein a multiply and accumulate operation is performed in the each MAC; wherein results of the multiply and accumulate operation are accumulated in the accumulator of the each MAC of the MAC array; wherein the final output of the adder block in the MACs of the MAC array is a row of a result matrix.

Depending on the desired implementation, the sequencer skips operation for the each element of the loaded row of the first matrix having a zero value. Further, depending on the desired implementation, the each MAC of the array of MACs can be configured to produce a result for a corresponding column of a result matrix of the matrix multiplication.

Depending on the desired implementation, the computation can involve matrix convolution between a coefficient matrix and activation matrix that produces a feature matrix as a result of the matrix convolution. In an example, a row of the coefficient matrix is loaded from the memory system into the said sequencer, wherein the said sequencer shifts the loaded row of the coefficient matrix to form the coefficient operands and forward the coefficient operands as a first operand to all MACs of the MAC array, wherein a row of the activation matrix is loaded in the MACs of the MAC array or a loaded row of the activation matrix is shifted in the MACs of MAC Array to form a second operand and a multiply accumulation operation is performed in the each MAC to achieve convolution computation.

As illustrated in FIGS. 5A and 5B, example implementations can involve a system configured to conduct sparse matrix multiplication between a first matrix and a second matrix, the system involving a compressed third matrix comprising row address and value pairs to represent the second matrix in compressed form; a memory system configured to provide operands and store results; and a row lookup unit configured to receive a row of the first matrix; receive row addresses from pairs of row addresses and values from one of the row of the compressed third matrix and output element of the row of the first matrix as pointed by corresponding the row address as an operand for the sparse matrix multiplication for each multiplier accumulator (MAC) in an array of MACs; the array of multiplier accumulators (MACs), the each MAC of the array of MACs including registers configured to receive operands as input and shift the operands between adjacent MACs of the array of MACs or within the each MAC; a multiplier configured to multiply the operands; one or more accumulators configured to hold a temporary result; and an adder block configured to conduct one or more of add, shift logic, and round to calculate final output.

Depending on the desired implementation, the memory system can be configured to fetch or prefetch the operands and provide the fetched or prefetched operands for the computation. Depending on the desired implementation, wherein the memory system can be configured to receive and buffer streaming input and provide the streaming input as the operands for the computation. Depending on the desired implementation, the each MAC of the array of MACs is configured to produce a result for a corresponding column of a result matrix of the sparse matrix multiplication.

Because of the streamlined process described above, matrix multiplication, sparse matrix multiplication, and convolution analysis may all be performed on the same hardware system (e.g., memory, processor, FPGA and MAC), without needing to alter the environment in which the process is being performed.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A system configured to conduct a computation, the system comprising:

a memory system configured to provide operands for the computation and store results;

a sequencer configured to:

in a first step, load a set of the operands from the memory system;

in a second step after the first step, shift the loaded set of operands to form shifted operands;

in a third step after the second step, provide each operand of the shifted operands to a multiplier accumulator (MAC) from an array of MACs as an operand while skipping ones of the shifted operands that are zero;

the array of MACs, each MAC of the array of MACs comprising:

a plurality of registers configured to receive an input of provided operands and shift the provided operands between adjacent MACs in the MAC array or within the each MAC;

a multiplier configured to multiply the provided operands;

an accumulator configured to store a temporary result; and an adder circuit comprising a carry propagate adder configured to add redundant sum and carry outputs to calculate a final output.

2. The system of claim 1, wherein the memory system is configured to:

fetch or prefetch the operands and provide the fetched or prefetched operands for the computation.

3. The system of claim 1, wherein the memory system is configured to:

receive and buffer streaming input and provide the streaming input as the operands for the computation.

4. The system of claim 1, wherein the computation is matrix multiplication between a first matrix and a second matrix.

5. The system of claim 4, wherein the sequencer is loaded with a row of the first matrix and is configured to:

for each element of the loaded row from the first matrix, perform a shift left operation to produce an operand common to all MACs of said MAC Array, the all MACs of the MAC Array are loaded with a corresponding row of a second matrix;

wherein a multiply and accumulate operation is performed in the each MAC;

wherein results of the multiply and accumulate operation are accumulated in the accumulator of the each MAC of the MAC array;

wherein the final output of the adder circuit in the MACs of the MAC array is a row of a result matrix.

6. The system of claim 5, wherein the sequencer skips operation for the each element of the loaded row of the first matrix having a zero value.

7. The system of claim 4, wherein the each MAC of the array of MACs is configured to produce a result for a corresponding column of a result matrix of the matrix multiplication.

8. The system of claim 1, wherein the computation is matrix convolution between a coefficient matrix and activation matrix that produces a feature matrix as a result of the matrix convolution.

9. The system of claim 8, wherein a row of the coefficient matrix is loaded from the memory system into the said sequencer, wherein the said sequencer shifts the loaded row of the coefficient matrix to form the coefficient operands and forward the coefficient operands as a first operand to all MACs of the MAC array, wherein a row of the activation matrix is loaded in the MACs of the MAC array or a loaded row of the activation matrix is shifted in the MACs of MAC Array to form a second operand and a multiply accumulation operation is performed in the each MAC to achieve convolution computation.

10. The system of claim 1, wherein the sequencer comprises a shift register configured to execute the second step.

11. The system of claim 1, wherein the sequencer comprises a zero detect circuit configured to execute the third step from input of the shifted operands from the shift register.

* * * * *